United States Patent [19]

Pignolet et al.

[11] Patent Number: 5,898,828
[45] Date of Patent: Apr. 27, 1999

[54] REDUCTION OF POWER USED BY TRANSCEIVERS IN A DATA TRANSMISSION LOOP

[75] Inventors: Lawrence G. Pignolet, Woonsocket, R.I.; Daniel Castel, Framingham, Mass.

[73] Assignee: EMC Corporation, Hopkinton, Mass.

[21] Appl. No.: 08/773,403

[22] Filed: Dec. 26, 1996

Related U.S. Application Data

[60] Provisional application No. 60/009,436, Dec. 29, 1995.

[51] Int. Cl.$^6$ ................................................. G06F 11/18
[52] U.S. Cl. ................................ 395/182.04; 395/182.08; 395/182.12; 395/182.2; 395/750.01; 395/750.08; 370/311
[58] Field of Search ........................ 395/182.04, 182.12, 395/182.16, 183.01, 182.08, 750.01, 750.03, 750.07, 750.08; 370/311

[56] References Cited

U.S. PATENT DOCUMENTS

| | | | |
|---|---|---|---|
| 4,733,393 | 3/1988 | Morton | 395/183.01 |
| 4,783,732 | 11/1988 | Morton | 395/182.08 |
| 4,800,559 | 1/1989 | Florea et al. | 370/94 |
| 5,206,939 | 4/1993 | Yanai et al. | 395/400 |
| 5,231,634 | 7/1993 | Giles et al. | 370/95.1 |
| 5,255,270 | 10/1993 | Yanai et al. | 371/10.2 |
| 5,269,011 | 12/1993 | Yanai et al. | 395/425 |
| 5,276,680 | 1/1994 | Messenger | 370/85.1 |
| 5,285,323 | 2/1994 | Hetherington et al. | 395/425 |
| 5,335,352 | 8/1994 | Yanai et al. | 395/800 |
| 5,341,493 | 8/1994 | Yanai et al. | 395/425 |
| 5,371,734 | 12/1994 | Fischer | 370/18 |
| 5,381,539 | 1/1995 | Yanai et al. | 395/425 |
| 5,436,902 | 7/1995 | McNamara et al. | 370/85.3 |
| 5,553,076 | 9/1996 | Behtash et al. | 370/311 |

OTHER PUBLICATIONS

FC–Al Direct Disk Attach Profile (Private Loop) Version 1.2 by Kurt Chan (pages from 2 to 41), Jan. 4, 1998.
Kurt Chan, FC–AL Direct Disk Attach Profile (Private Loop) Verison 1.2, Hewlett–Packard, 9000 Foothills Blvd., Roseville, CA, 95747–5601, Preliminary Draft Version, 1.20, Jan. 4, 1995, pp. 1–41.

*Primary Examiner*—Robert W. Beausoliel, Jr.
*Assistant Examiner*—Pierre E. Elisea
*Attorney, Agent, or Firm*—Arnold White & Durkee

[57] ABSTRACT

Transceivers are selectively activated to reduce power in a network of data processing devices linked by a data transmission loop. Each of the devices is linked by a transceiver, and passes data from a previous device in the loop to a next device in the loop when not transmitting data onto the loop. For example, the data processing devices are disk drives in a storage subsystem. Delays in establishing communication after transceiver activation can be avoided by continuously powering a bit clock oscillator or bit synchronizer. In one embodiment, a loop controller in the loop sends activation and deactivation signals to addressed transceivers via an auxiliary channel. In another embodiment, when a device detects that communication is occurring between other devices for a certain period of time, the device selectively deactivates its transceiver for the certain period of time. For redundancy, the data processing devices can be connected via dual loops, and then power is further reduced by activating at most one of the two transceivers in a device at any given time. In this case, if a transceiver failure occurs, the failed transceiver is bypassed and the other transceiver for the device is activated. For example, when a loop controller detects a transceiver failure, the loop controller sends transceiver activation and deactivation signals over the auxiliary channel.

37 Claims, 10 Drawing Sheets

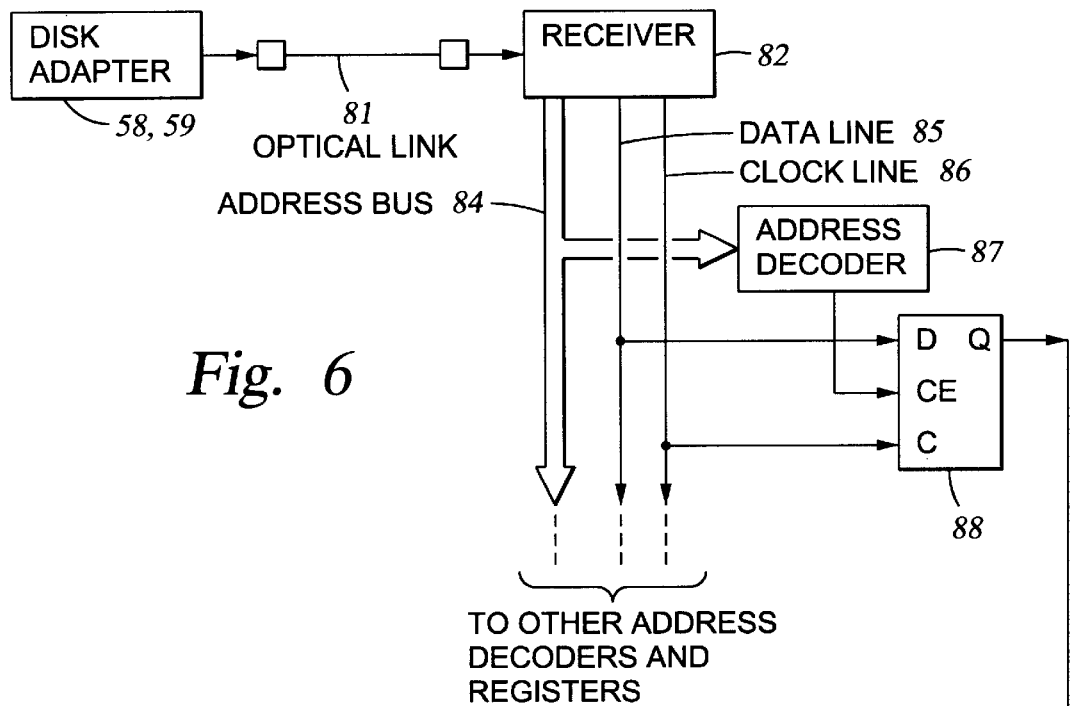
*Fig. 6*
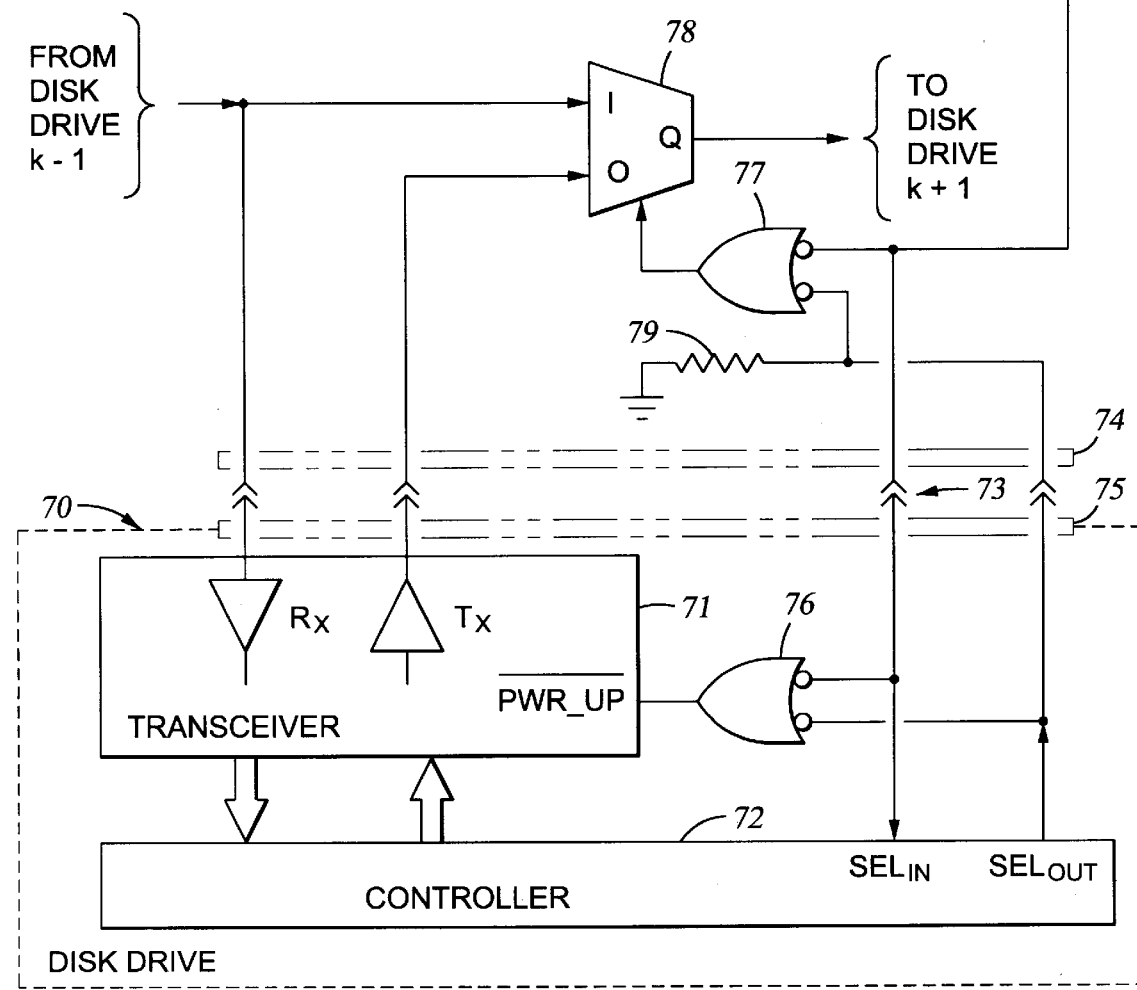

REDUCTION OF POWER USED BY TRANSCEIVERS IN A DATA TRANSMISSION LOOP

RELATED APPLICATIONS

The present application is a continuation of U.S. Provisional Patent Application Ser. No. 60/009,436 filed Dec. 29, 1995 and entitled "Reduction of Power Used by Transceivers in a Data Transmission Loop," by Lawrence G. Pignolet and Daniel Castel, incorporated herein by reference.

BACKGROUND OF THE INVENTION

1. Field of the Invention

The present invention relates generally to a data network having data processing devices linked for data transmission. In particular, the present invention relates to obtaining a reduction in the power consumed by data transceivers in such a network.

2. Background Art

Data transmission loops have been used in local area networks of data processing devices for coupling data terminals to a central processor. The loop topology permits each data terminal to monitor data transmitted over the loop, and to insert data into the loop. More recently, the loop topology has been proposed for connecting disk drives to a storage controller in a storage subsystem. In this application, the loop interfaces in a simple way to optical fibers interconnecting the storage controller to the disk drives, and the number of pin connections to the disk drives is reduced for enhanced reliability. Manufacturers of data processing devices and disk drives are presently cooperating in the development of standards for the transceivers, cables and connectors to be used in connecting loops of disk drives to data processing equipment. The data transmission loop has been named Fibre Channel Arbitrated Loop, and the current standards are described in Kurt Chan, FC-AL Direct Disk Attach Profile (Private Loop) Version 1.2, Hewlett-Packard, 9000 Foothills Blvd., Roseville, Calif. 95747-5601, Preliminary Draft Version, 1.20 (Jan. 4, 1995), incorporated herein by reference. One disadvantage of the Fiber Channel Arbitrated Loop is that all of the transceivers in the loop are running continuously. To avoid skews and to minimize the number of connections, data is transmitted serially over the loop. Consequently, it is desirable to transmit data at the highest practical rate, such as at 265.625 MHz, 531.25 MHz, or preferably 1.0625 GHz. Consequently, transceivers must consume a substantial amount of power in order to serialize and deserialize the data at such a high rate. For example, a 3 and ½ inch disk drive employing a standard SCSI interconnect consumes about 15 watts. The 3 and ½ inch drive, when adapted with Fiber Channel transceivers available in the first quarter of 1996, is expected to require no less than about 18 watts. Consequently, a disk array cabinet designed for the standard SCSI drives cannot be fully populated due to power supply and cooling limitations. The option of increasing the power supply and cooling capacity is undesirable since it would require a re-design of the power supply and cabinets, and would increase the cost of ownership, cost of air conditioning, and the cost of power.

SUMMARY OF THE INVENTION

The basic objective of the present invention is to reduce the power consumption of transceivers in a data transmission loop interconnecting a multiplicity of data processing devices.

In accordance with a basic aspect of the invention, a data network has a data transmission loop including a multiplicity of data processing devices, each of which is linked to the loop by a transceiver, and passes data from a previous device in the loop to a next device in the loop when not transmitting data onto the loop. The power consumed by the transceiver is reduced by selectively activating and deactivating the transceiver, and passing data from the previous device in the loop to the next device in the loop when the transceiver is deactivated. The transceiver can be designed to continuously regenerate data and to avoid delays in establishing communication after the transceiver is activated by continuously powering a bit clock oscillator or bit synchronizer circuits used by the transceiver. In one embodiment, an auxiliary data channel from a loop controller in the loop to each device in the loop is used to send a transceiver activation or deactivation signal to an addressed one of the transceivers.

In an alternative embodiment, when a device detects that communication is occurring with another device for a predetermined period of time, the device selectively deactivates its transceiver for that predetermined period of time. For example, a loop controller in the data transmission loop periodically sends a word synchronization code followed by an address of a device that is to communicate with the loop controller. When another device finds that the word synchronization code is not followed by its address, it deactivates its transceiver for a fixed period of time. Alternatively, a message length parameter could follow the address, and the device could deactivate its transceiver for a period of time determined by the message length parameter.

In accordance with another aspect of the invention, the data network has dual redundant data transmission loops, each linking a respective one of two transceivers in each device, only one of which is powered on at any given time. If a failure of the powered-on transceiver occurs, the failed transceiver is bypassed and the other transceiver for the device is activated. For example, the transceiver failure is detected by a loop controller in the data transmission loop, and upon detecting the transceiver failure, the loop controller addresses the failed transceiver and sends a bypass and deactivation signal over an auxiliary data channel. One-half of the transceivers are initially activated in each of the dual redundant loops so that along each loop, the transceivers are alternately activated or deactivated and bypassed. This initial state minimizes the guaranteed recovery time from a loop failure by activating all of the inactive transceivers in the functioning loop, and best insures data regeneration through the loop by the transceivers that are activated.

In a specific embodiment, the data processing devices are disk drives in a storage subsystem, and the loop controller is a storage controller of the storage subsystem. Disk adapters in the storage controller are linked to strings of the disk drives by optical fibers and shielded twisted pair cable ("twinax") in accordance with industry group standards for a Fiber Channel Arbitrated Loop. The disk drives can also be given the capability of selecting among multiple power sources (such as 5 volts or 12 volts) for providing a regulated voltage (such as 3.3 volts) to the disk drive circuits, in order to reduce the need for excess power supply capacity.

BRIEF DESCRIPTION OF THE DRAWINGS

Other objects and advantages of the invention will become apparent upon reading the following detailed description with reference to the accompanying drawings wherein:

FIG. 6 is a schematic diagram illustrating the use of an additional optical link to permit a disk adapter to address a selected disk drive and port bypass circuit in order to turn on and off a loop transceiver in the disk drive;

Figure 1:
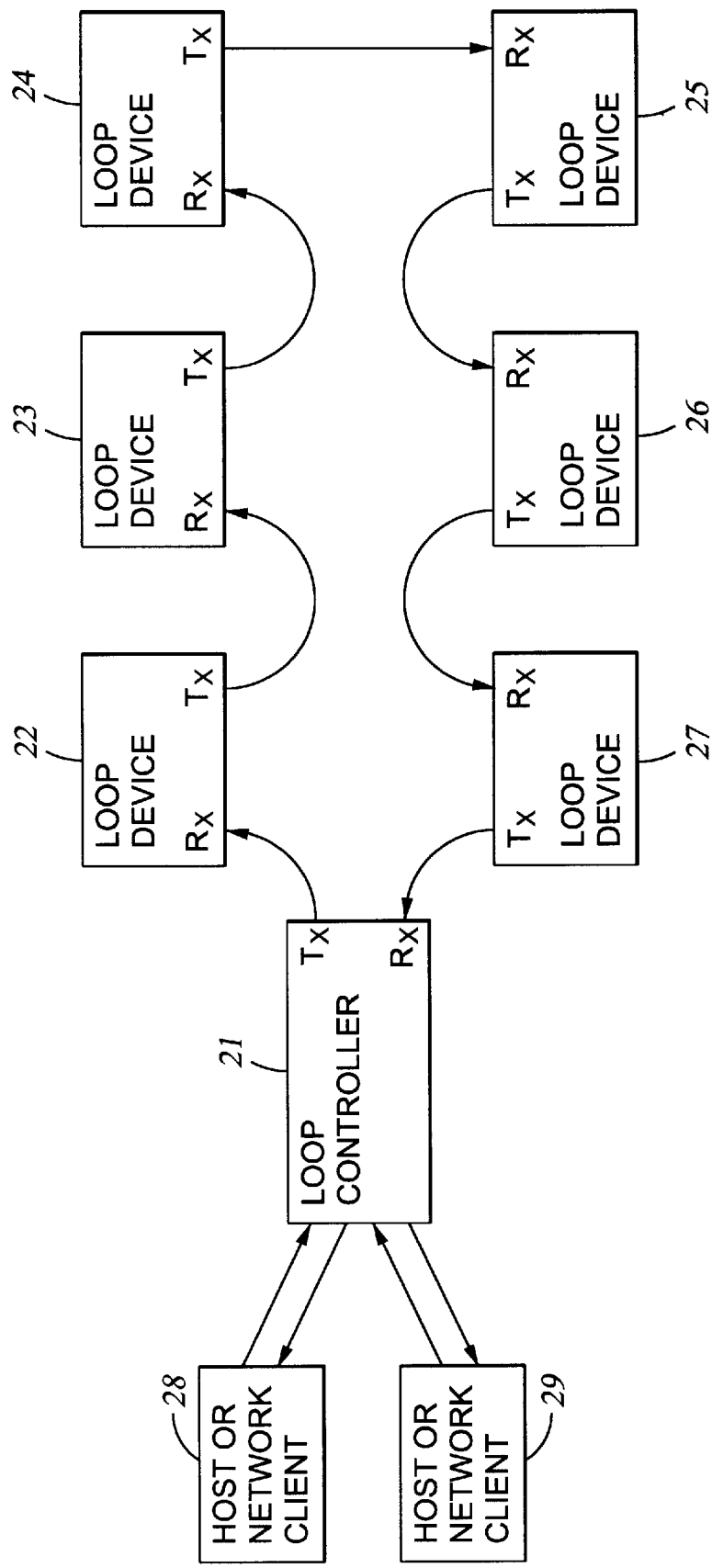
FIG. 1 is a block diagram showing a conventional configuration of a data network applying a data transmission loop for linking data processing devices.

While the invention is susceptible to various modifications and alternative forms, specific embodiments thereof have been shown by way of example in the drawings and will be described in detail. It should be understood, however, that it is not intended to limit the invention to the particular forms disclosed, but on the contrary, the intention is to cover all modifications, equivalents, and alternatives falling within the scope of the invention as defined by the appended claims.

DETAILED DESCRIPTION OF THE PREFERRED EMBODIMENTS

Turning now to FIG. 1, there is shown a block diagram of a data network including a number of data processing devices linked by a data transmission loop. The data transmission loop includes a loop controller 21, and loop devices 22, 23, 24, 25, 26, and 27. Each of the devices 21–27 in the data transmission loop has a transceiver including a transmitter port (Tx) and a receiver port (Rx).

A loop controller 21 acts as an arbitrator that addresses selected ones of the loop devices 22–27 to enable the addressed loop device to transmit data over the transmission loop. When the loop device is not transmitting data over the transmission loop, it merely acts as a repeater to transmit data that it receives. The loop controller 21 in particular controls the loop to satisfy requests from host computers or network clients 28, 29 that are also linked to the loop controller 21.

The network topology shown in FIG. 1 has been used for local area networks. More recently, the loop topology has been proposed for linking disk drives to a storage controller. In this case, the storage controller would be the loop controller 21 and the disk drives would be the loop devices 22–27.

Figure 2:
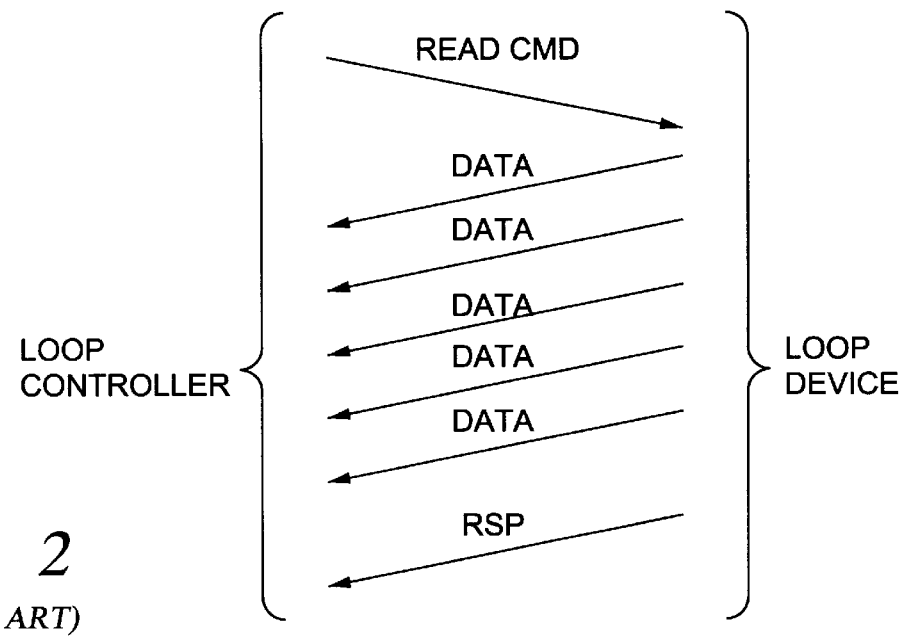
FIG. 2 is a conventional protocol used in the network of FIG. 1 for permitting a loop controller to read data from a selected loop device in the data network of FIG. 1.

Turning now to FIG. 2, there is shown a data transmission protocol for permitting the loop controller (21 in FIG. 1) to read data from an addressed one of the loop devices (22–27 in FIG. 1). The loop controller transmits a read command addressing one of the loop devices. The addressed one of the loop devices responds by transmitting single or multiple sequences of data requested by the loop controller. At the end of data transmission, the loop device transmits a response signal (RSP).

Figure 3:
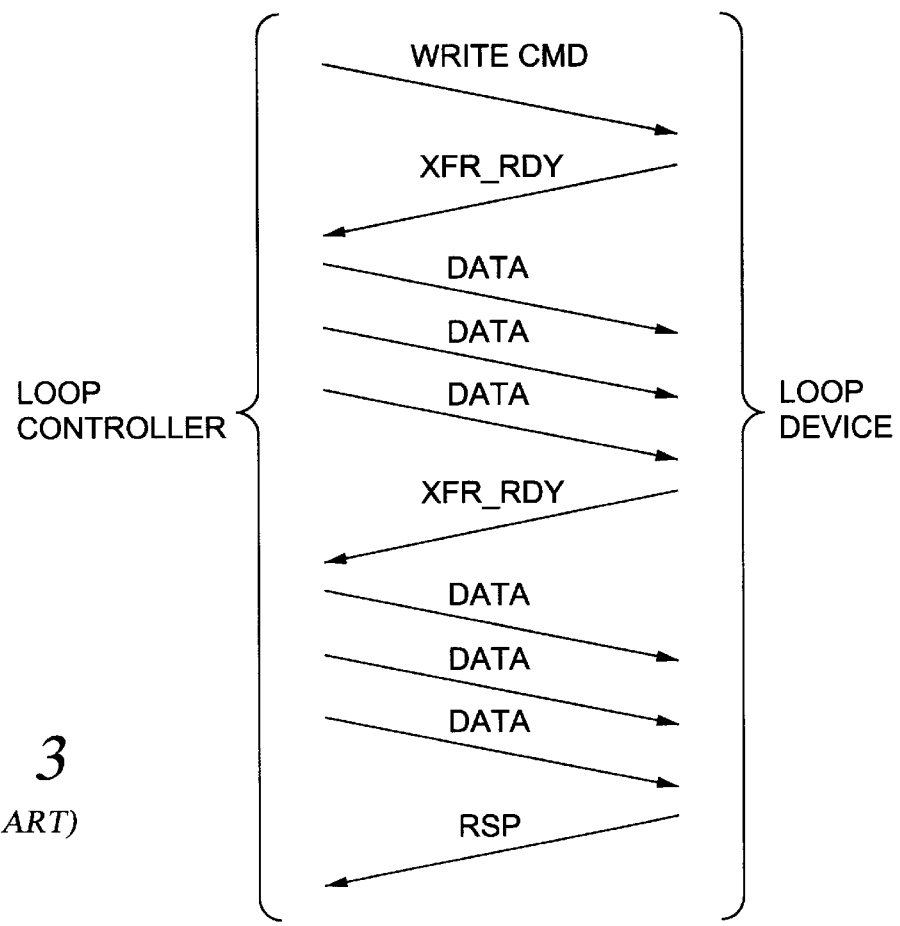
FIG. 3 is a conventional protocol used by the loop controller for writing data to a selected loop device in the data network of FIG. 1.

Turning now to FIG. 3, there is shown a data transmission protocol used by the loop controller to write data to a loop device. The loop controller transmits a write command addressing one of the loop devices. When a loop device is ready to receive data from a loop controller, the loop device returns a transfer ready (XFR_RDY) signal. Then the loop controller transmits a sequence of data to the loop device, and waits for another transfer ready signal from the loop device. Upon receiving another transfer ready signal, the loop controller transmits a remaining sequence of data to the loop device. Once the loop device has received the remaining sequence of data, the loop device returns a response signal (RSP) to the loop controller, indicating that all of the data has been successfully received.

Figure 4:
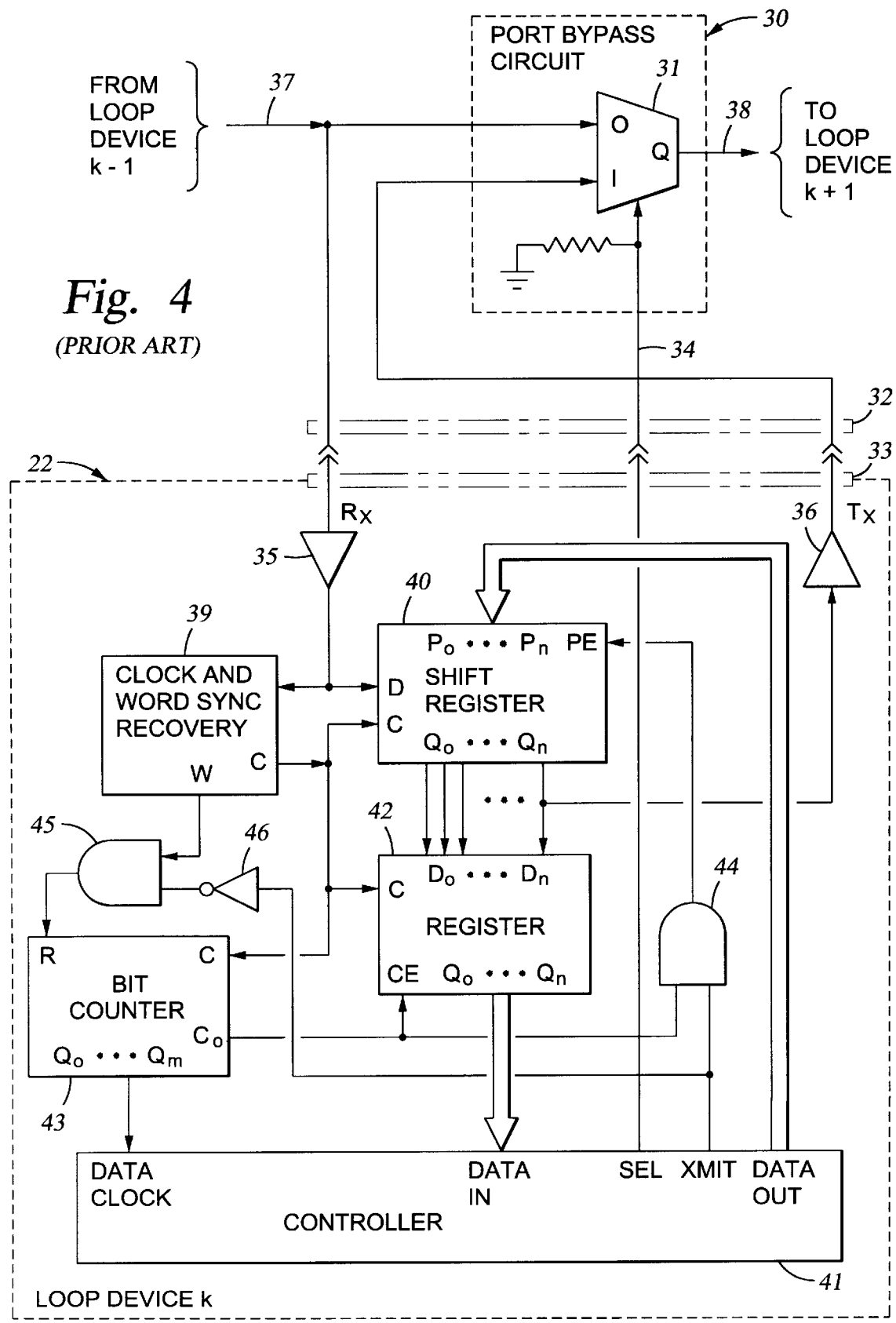
FIG. 4 is a block diagram showing details of a port bypass circuit and a data transceiver associated with a loop device in the data network of FIG. 1.

Turning now to FIG. 4, there are shown a conventional port bypass circuit and components in a conventional transceiver of a loop device. The port bypass circuit has been used for maintaining the continuity of the data transmission loop when a loop device is removed from the data transmission loop. The port bypass circuit includes a multiplexer 31, such as Motorola Part No. MC10SX1189. The port bypass circuit 30 is wired to a female connector 32 which receives a male connector 33 mounted to the loop device 22. When the loop device 22 is removed so that the connector 33 disengages from the connector 32, a select line 34 of the multiplexer 31 assumes a logic low state so that the multiplexer 31 maintains continuity of the loop from the previous loop device (k−1) to the next loop device (k+1). The receiver port (Rx) is provided by a differential receiver 35, and the transmitter port (Tx) is provided by a differential transmitter 36. In this regard, the links 37, 38 of the data transmission loop are made of shielded twisted pair wire, commonly known as "twinax."

The transceiver circuits in the loop device 22 include clock and word sync recovery circuits 39. These circuits typically include a phase-locked loop for clock recovery and a decoder or framing circuit for word sync recovery, although oversampling-type clock recovery circuits could be used in lieu of a phase-locked loop. The oversampling type circuits permit faster acquisition of bit sync, although the phase-locked loop type circuits offer improved noise rejection.

The bit clock from the clock recovery circuits 39 clocks a shift register 40 performing parallel-to-serial conversion of data from a device controller 41 for transmission over the data transmission loop. The shift register 40 also performs serial-to-parallel conversion of data received from the transmission loop. Parallel data from the shift register 40 is received in a register 42 for transmission to the controller 41. The register 42 isstrobed by a bit counter 43 that counts the number of bits per data word, and generates a data clock received by the controller 41. An AND gate 44 combines the carry out of the bit counter 43 with a transmit enable signal (XMIT) to provide a parallel load enable signal to the shift register 40 during data transmission from the controller 41 to the data transmission loop. The bit counter 43 is reset when the clock and word sync recovery circuits 39 detect a word sync so long as the controller 41 is not transmitting. For this purpose, an AND gate 45 and an inverter 46 generate a reset signal to the bit counter 43 from a word sync signal (W) from the sync recovery circuits 39 and the transmit enable signal (XMIT).

Figure 5:
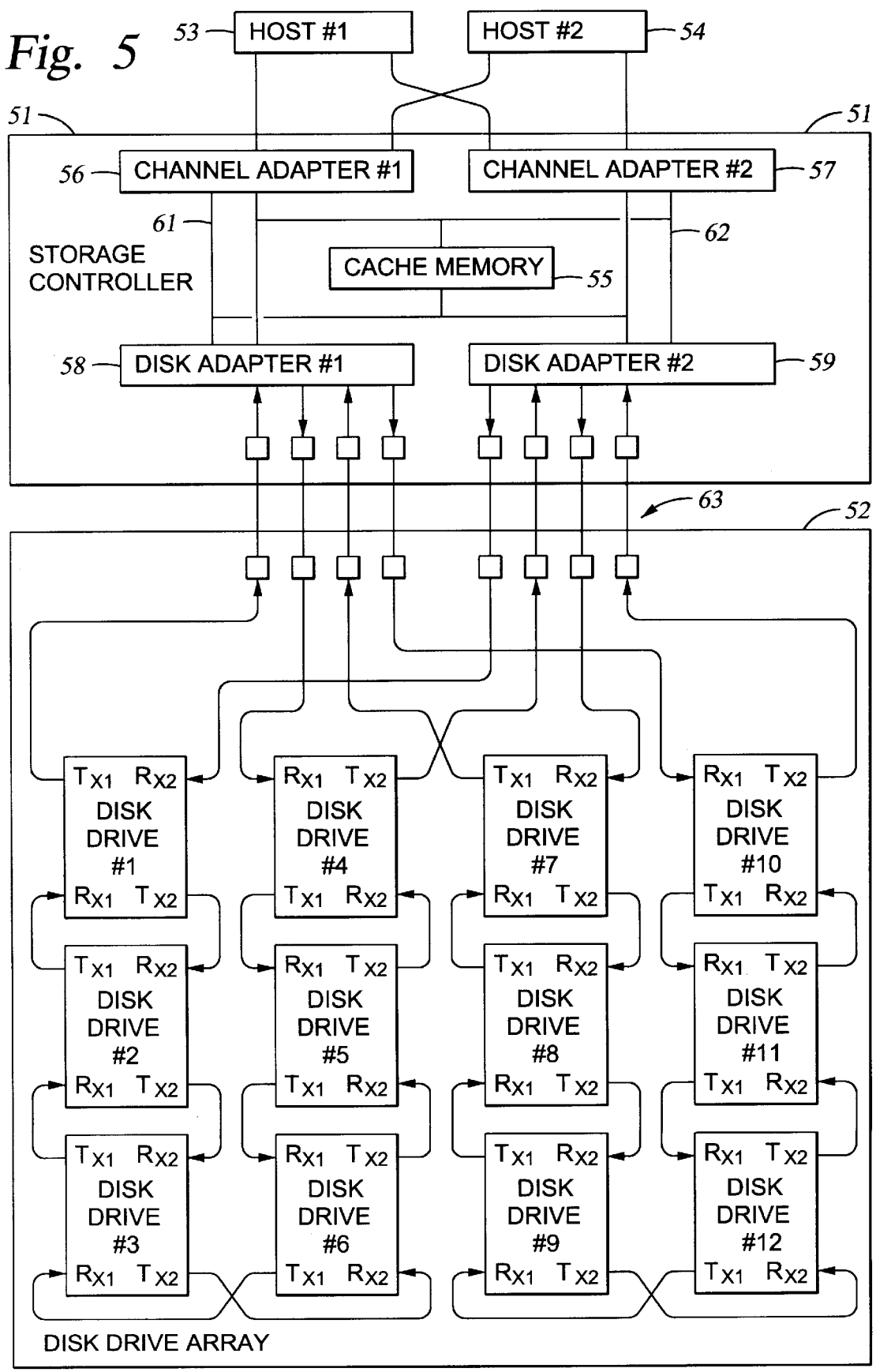
FIG. 5 is a block diagram illustrating the use of Fiber Channel Arbitrated Loops for interconnecting disk drives in an array to disk adapters in a storage controller.

Turning now to FIG. 5, there is shown a block diagram of a disk array storage subsystem for which the present invention is particularly useful. The storage subsystem includes a storage controller 51 in a disk drive array 52. The storage controller 51 receives data access requests from a number of host central processing units 53, 54. The storage controller attempts to satisfy these data access requests by accessing a cache memory 55. If the desired data are not found in the cache memory 55, then the data are obtained from the disk drives in the disk drive array 52.

The storage controller 51 has a number of channel adapter processors 56, 57 for interfacing the host computers 53, 54 to the cache memory 55. The storage controller 51 has a number of disk adapter processors 58, 59 for staging data from the disk drives to the cache memory 55 when requested data is not available in the cache memory. The disk adapters 58, 59 also perform a destage operation to write new or modified data from the cache memory 55 back to the disk drives in the disk drive array 52. For redundancy, each of the channel adapters 56, 57 and disk adapters 58, 59 are interconnected to the cache memory by dual busses 61, 62. Further details of the preferred construction for the storage controller 51 are found in Yanai et al., U.S. Pat. Nos. 5,381,539; 5,341,493; 5,335,352, 5,255,270; 5,269,011; and 5,206,939; all incorporated herein by reference.

In the storage subsystem shown in FIG. 5, the disk array 52 is stored in a cabinet that is separate from the storage controller 51. In situations where space close to the host processing units 53, 54 is scarce, the disk array 52 can be mounted a considerable distance from the storage controller 51. To provide a high degree of immunity from electrical interference, the disk drive array 52 is linked to the storage controller 51 by a number of optical fibers generally designated 63. As shown in FIG. 5, for example, each disk adapter 58 is interconnected via two data transmission loops to two respective strings of six disk drives. (In practice, a larger number of disk drives could be included in each string.) For redundancy, each of the twelve disk drives in the disk drive array 52 has two loop transceivers. The first loop transceiver for each disk drive has a transmit port (Tx1) and a receiver port (Rx1), and the second loop transceiver for each disk drive has a transmitter port (Tx2) and a receiver port (Rx2). The first transceiver links the disk drive to the first disk adapter 58, and the second transceiver links the disk drive to the second disk adapter 59. Therefore, the storage subsystem can continue to operate when either a single disk adapter fails or a single transceiver fails.

A problem with linking the disk drives in the disk array 52 into the data transmission loops of the optical fibers 69 is that the transceivers require a good deal of power to handle the high serial data rates of the loops. In accordance with the present invention, the power consumed by the transceivers is reduced by selectively reducing the power to the transceivers so that each transceiver is at some time incapable of providing data to or transmitting data from the controller in the disk drives. The present invention provides a mechanism for selectively activating the transceivers so that when necessary a transceiver becomes capable of providing data to or transmitting data from its associated disk drive controller. As will be further described below, a transceiver can be activated by providing an alternative link for receiving an activation command from the storage controller, or by activating the transceiver at a programmed time in the future.

Turning now to FIG. 6, there is shown a schematic diagram of an alternative data link for selectively activating or deactivating a transceiver 71 associated with a controller 72 of a disk drive generally designated 70. This circuit uses an additional link 73 in the connectors 74 and 75 connecting the disk drive 70 to the cabinet of the disk drive array. The pin connections 73 convey an enable signal from the storage controller. A NAND gate 76 shuts off the transceiver 71 when either the signal on the connection 73 is a logic 0, or when the controller provides a logic 0. In a similar fashion, a NAND gate 77 combines the activation signal from the storage controller with the activation signal from the disk drive controller 72 to provide a select signal to a bypass multiplexer 78 so that the transceiver 71 is bypassed in the data transmission loop when the transceiver is shut off. Moreover, when the disk drive 70 is removed from the disk drive array, a resistor 79 provides a logic low signal to the NAND gate 77 causing the multiplexer 78 to bypass the opened transceiver data path.

To provide the activation signal from the storage controller, an additional optical link 81 interconnects an additional receiver 82 in the disk drive array to the disk adapter 58, 59 included in the data transmission loop of the transceiver 71. The receiver 82 converts serial data on the optical link 81 to parallel data words providing bits for an address bus 84 and a bit for a data line 85. The receiver also provides a clock line 86 conveying a clock synchronized to the new data words from the receiver 82. The disk drive array is also provided with an address decoder 87 for each transceiver in the loop of the disk adapter 58, 59 and each of these address decoders decodes a unique address for the transceiver 71. A single bit register 88 is clocked by the clock line 86 and enabled by the address decoder 87 to receive the data bit on the data line 85 when addressed by the address on the address bus 84. In this fashion, the disk adapter 58, 59 can address any transceiver to which it is connected, to either set or reset the activation signal to the transceiver.

The circuitry shown in FIG. 6 could be used to activate a transceiver in a disk drive only when data is to be transmitted to or received from that particular transceiver. However, if power to that transceiver is entirely shut off, then a good deal of time will be required for the transceiver to stabilize before it is capable of transmitting or receiving data. One solution to this problem is to shut off power only to those circuits in the transceiver that are not essential for maintaining bit synchronization, as will be further described below with reference to FIG. 10. Another solution to this problem, however, is to recognize that only one of the transceivers in each disk drive need be active at any given time, and that one transceiver need be shut off only in the unlikely event of a malfunction in the transceiver or in the disk adapter to which it is linked.

Figure 7:
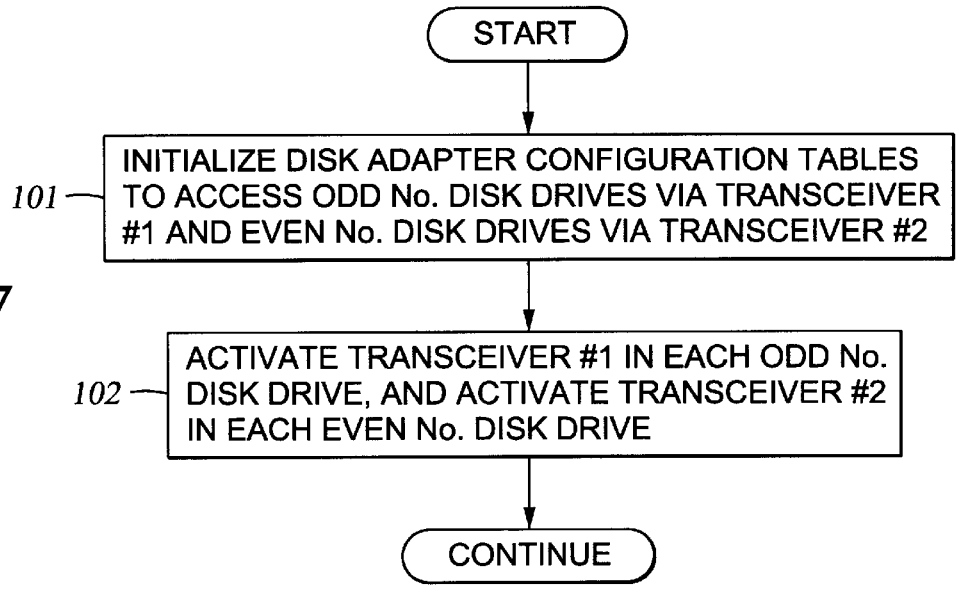
FIG. 7 is a flow chart of steps in a storage controller program for setting up an initial configuration of the transceivers in the disk drives in the system of FIG. 5.

Turning now to FIG. 7, there is a flow chart of steps in software executed by the storage controller 51 to initially configure the transmission loops from the disk adapters to the disk drive array. In a first step 101, the storage controller initializes disk adapter configuration tables to indicate that odd numbered disk drives are to be accessed via the first transceiver in each drive, and the even numbered disk drives are to be accessed via the second transceiver in each of the disk drives. Then in step 102, the storage controller activates the first transceiver in each odd numbered disk drive, and activates the second transceiver in each even numbered disk drive. Execution of the software for the storage controller then continues until there is a failure of the storage controller to communicate with a disk drive. When the communication fault is isolated to a particular disk drive, the storage controller executes a routine shown in FIG. 8.

Figure 8:
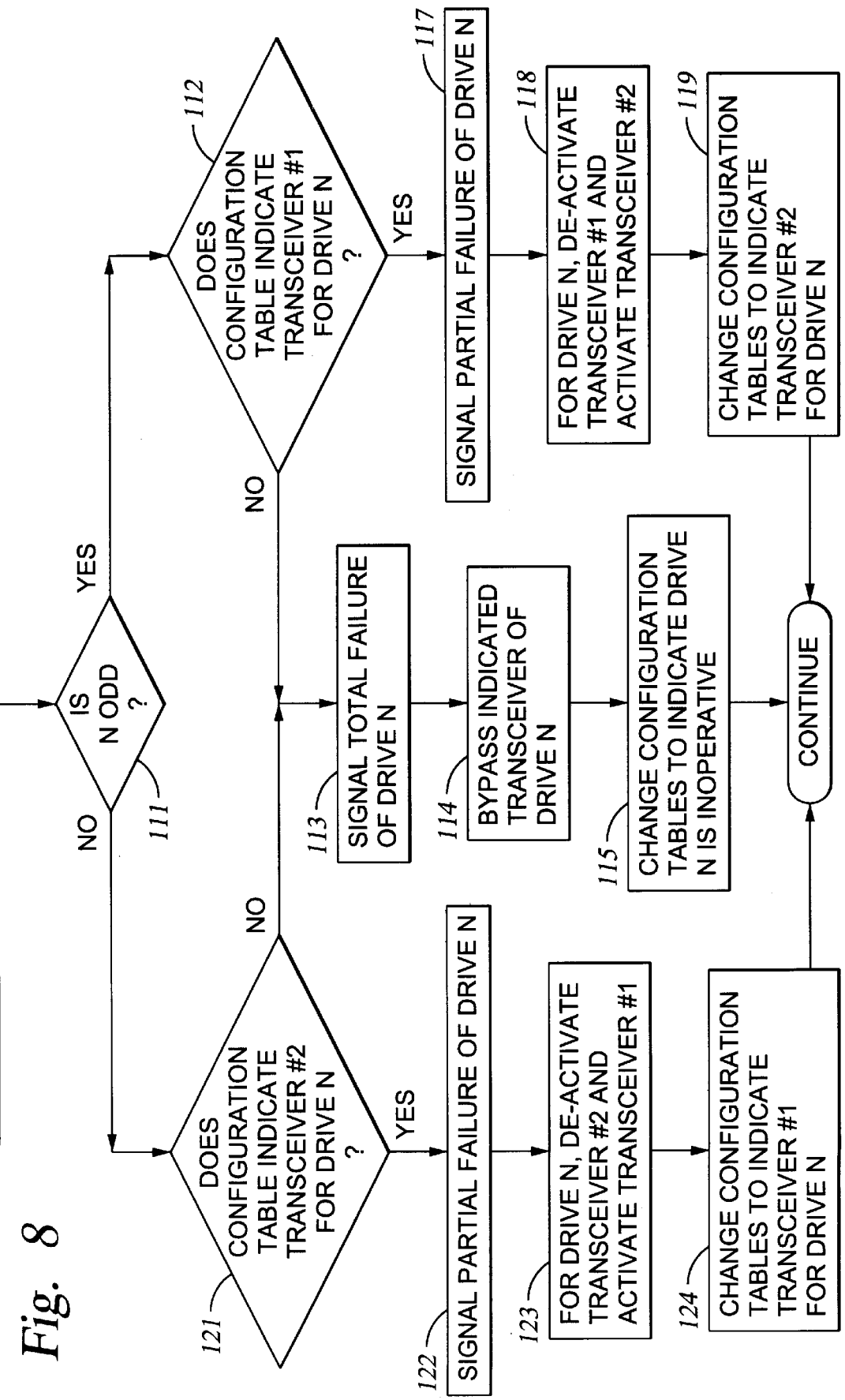
FIG. 8 is a flow chart of steps in a storage controller program performed upon detecting a failure of a drive to respond to the storage controller including steps for de-activating a faulty one of the transceivers in the disk drive and activating the other one of the transceivers in the disk drive.

As shown in FIG. 8, when the Nth disk drive fails to respond to the storage controller, the storage controller determines in step 111 whether the number N is odd or even. If N is odd, then execution branches to step 112. In step 112, the storage controller checks the configuration tables to determine whether the first transceiver is indicated for the disk drive. If not, then execution branches to step 113 to signal a total failure of the disk drive. For example, an operator of the storage subsystem would be informed that the disk drive should be replaced, and the system may attempt to reconstruct the data in the failed disk drive if the system has sufficient redundancy information for reconstructing the disk drive using so-called "RAID" techniques. Next, in step 114, the storage controller bypasses the indicated transceiver of the disk drive by addressing the single-bit control register (88 in FIG. 6) for the indicated transceiver of the disk drive. Then in step 115, the storage controller changes the configuration table to indicate that the disk drive is inoperative. Execution then continues.

If in step 112 the configuration table indicates the first transceiver for the disk drive, then execution continues from step 112 to step 117 where the storage controller signals a partial failure of the disk drive. For example, an operator or user of the storage subsystem would be informed that the disk drive should be replaced, and a background task may be scheduled for copying data from the disk drive in anticipation of the disk drive being replaced. Then in step 118, the first transceiver for the drive is deactivated, and the second transceiver for the drive is activated. Finally, in step 119, the configuration table is changed to indicate that the second transceiver for the disk drive should be used.

If in step 111 the number N is even, then execution branches to step 121. In step 121, the storage controller checks the configuration table to find whether the second transceiver is indicated for the disk drive. If not, then execution branches from step 121 to 113 to signal a total failure of the disk drive. Otherwise, execution continues from step 121 to step 122 where the storage controller signals a partial failure of the disk drive. Next, in step 123, the second transceiver for the disk drive is deactivated, and the first transceiver for the disk drive is activated. Finally, in step 124, the storage controller changes the configuration table to indicate that the first transceiver should be used for the disk drive.

As mentioned above, the circuitry in FIG. 6 could be used for activating the transceiver in a disk drive only when the disk drive needs to communicate with the storage controller. If all of the power is shut off to the bit clock generator of a transceiver, however, considerable time is required for bit synchronization to be achieved. The time for bit synchronization would include the time for the frequency of the bit clock to stabilize, as well as the time for the bit clock to become synchronized to the data transmitted over the transmission loop. To minimize these delays, the transceiver circuits could be partitioned so that the bit synchronization circuits are always powered up, but the other circuits would only be powered up when needed.

Figure 9:
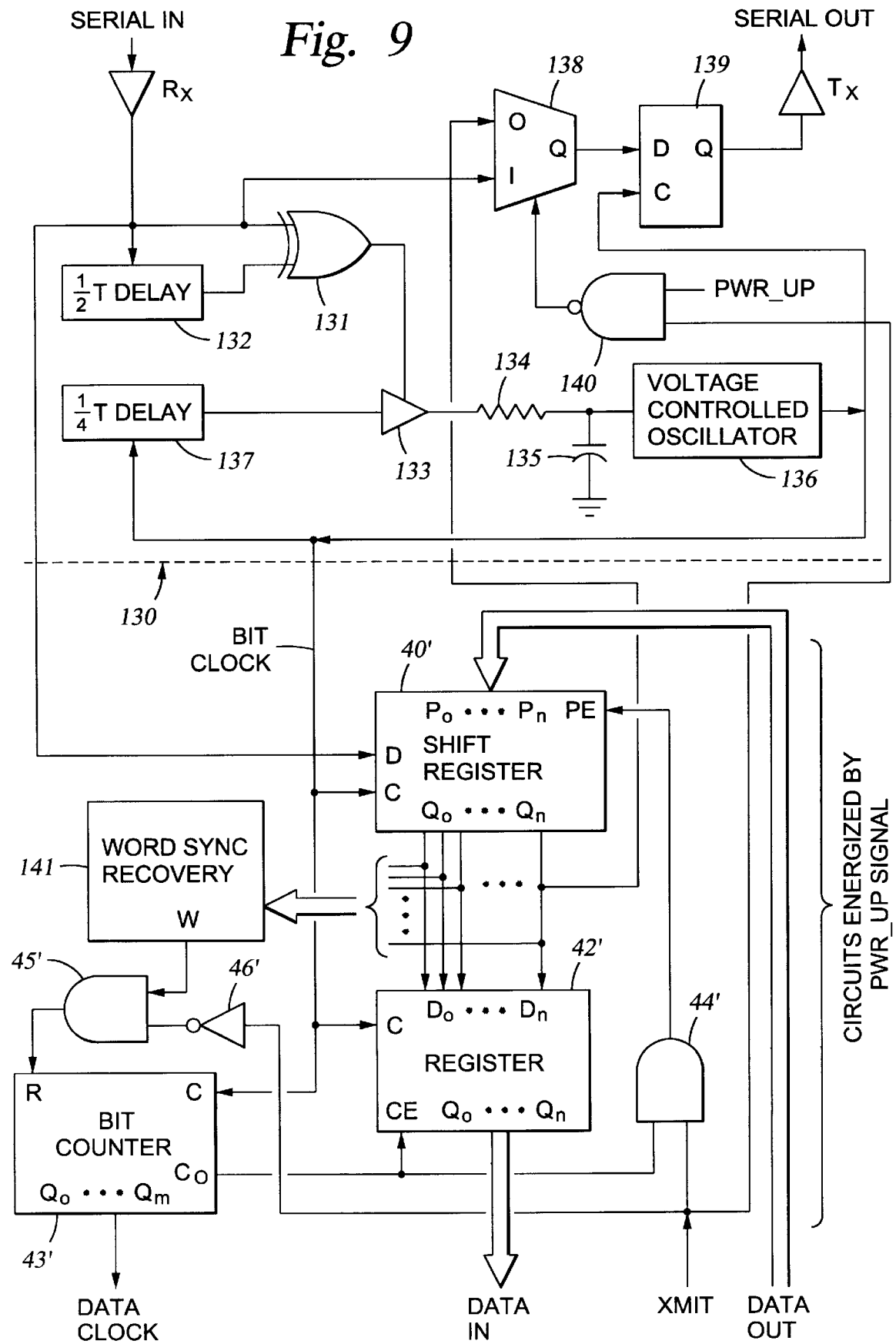
FIG. 9 is a schematic diagram of a transceiver configured to permit a major portion of the circuits in the transceiver to be powered down without disrupting synchronization of the transceiver to the data transmitted over a data transmission loop.

Turning now to FIG. 9, there is shown a schematic diagram of a transceiver in which bit synchronization circuits of the transceiver are shown above a dashed line 130 and the other circuits are shown below the dashed line. The circuits above the dashed line 130 are always energized, but the circuits below the dash line are energized only when a PWR_UP signal is active. The use of such circuitry for each of the transceivers in the disk drive would permit the storage controller to use the circuitry of FIG. 6 to quickly power up all of the circuits in the transceiver only when the storage controller needs to communicate with the transceiver.

As shown in FIG. 9, the bit synchronization circuits include a phase-locked loop. The phase-locked loop includes a transition detector having an exclusive OR gate 131 and a delay line 132 having a delay of approximately one-half of the period of the bit rate of the data transmitted over the data transmission loop. The output of the exclusive OR gate 131 activates a tri-state driver 133, such as a N-channel FET which acts as a phase detector to provide an error signal to a loop filter. The loop filter includes a series resistor 134 and a shunt capacitor 135. The voltage on the shunt capacitor 135 provides a frequency control signal to a voltage controlled oscillator 136 which generates the bit clock. The bit clock is delayed by one-quarter period of the bit rate in a delay line 137 before being applied to the tri-state gate 133. The delays of the delay lines 132 and 137 should proportionally match each other, and these delay lines could each include a string of inverters. To insure that the complete activation of a transceiver will not disrupt the bit synchronization of other transceivers in the data transmission loop, the circuits always powered up include a multiplexer 138 and a d-type flip-flop 139. The flip-flop 139 regenerates the data from the receiver port (Rx) for transmission from the transmitted port (Tx) unless the transceiver is fully energized and transmitting, as controlled by a NAND gate 140.

The circuits in the lower part of FIG. 9 which are similar to the circuits in FIG. 4 are designated with similar but primed reference numerals. The circuits energized by the PWR_UP signal also include a word sync decoder 141 which recognizes the presence of a word sync code in the shift register 40'. In this regard, the data transmitted over the transmission loop is encoded to ensure that there will always be transitions in the data to facilitate bit synchronization, and to insure that the word sync code will appear in the shift register 40' only when intended. Suitable encoding schemes are well known in the art, such as a conventional eight bit to ten bit encoding technique proposed in the Fiber Channel specification cited above.

Figure 10:
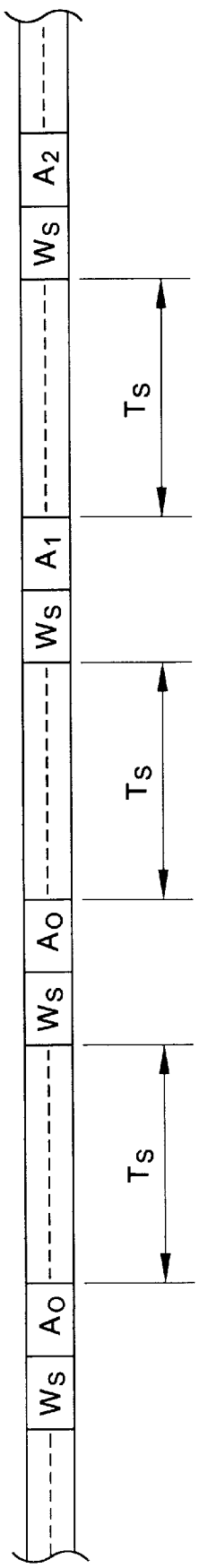
FIG. 10 is a timing diagram illustrating the periodic insertion of word sync and addresses in the data stream transmitted over the data transmission loop by the loop controller.

The transceiver circuitry shown in FIG. 9 would also be useful in a power reduction scheme whereby the transceiver circuits are fully energized only at programmed times in order to search whether the disk drive is being accessed by the storage controller. As shown in FIG. 10, for example, the word sync code (Ws) and the address (A0, A1, A2, etc.) of the loop device presently being accessed is periodically transmitted over the transmission loop by the storage controller. Therefore, unless a transceiver is addressed, it can be shut off for a period of time Ts between the word sync and address codes.

Figure 11:
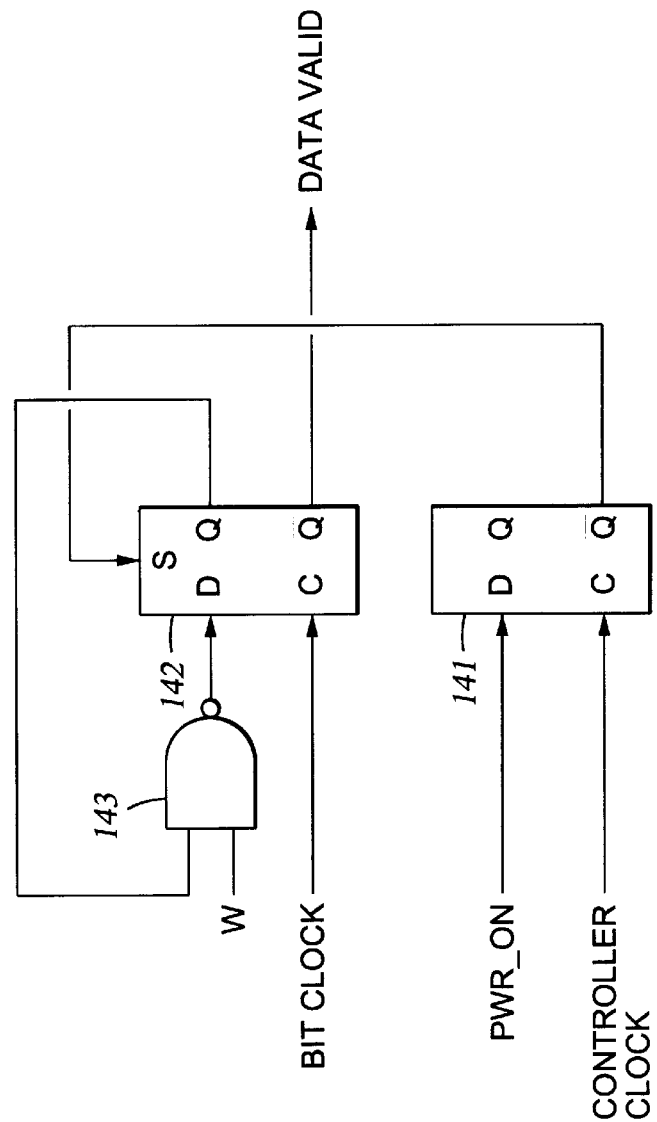
FIG. 11 is a schematic diagram of circuitry added to the transceiver for providing a data valid signal when word synchronization is obtained after powering up a transceiver.

For a transceiver to be periodically powered down and powered up, the transceiver should also give an indication of whether or not word sync has been achieved, in order to permit the microcontroller to look for the transceiver address. As shown in FIG. 11, the circuitry includes a d-type flip-flop 141 providing a set signal continuing for a controller clock cycle after the POWER_ON signal is asserted. This set signal sets a flip-flop 142. The flip-flop 142 is reset by a NAND gate 143 in response to the word sync signal (W) from the word sync decoder (141 in FIG. 9).

Figure 12:
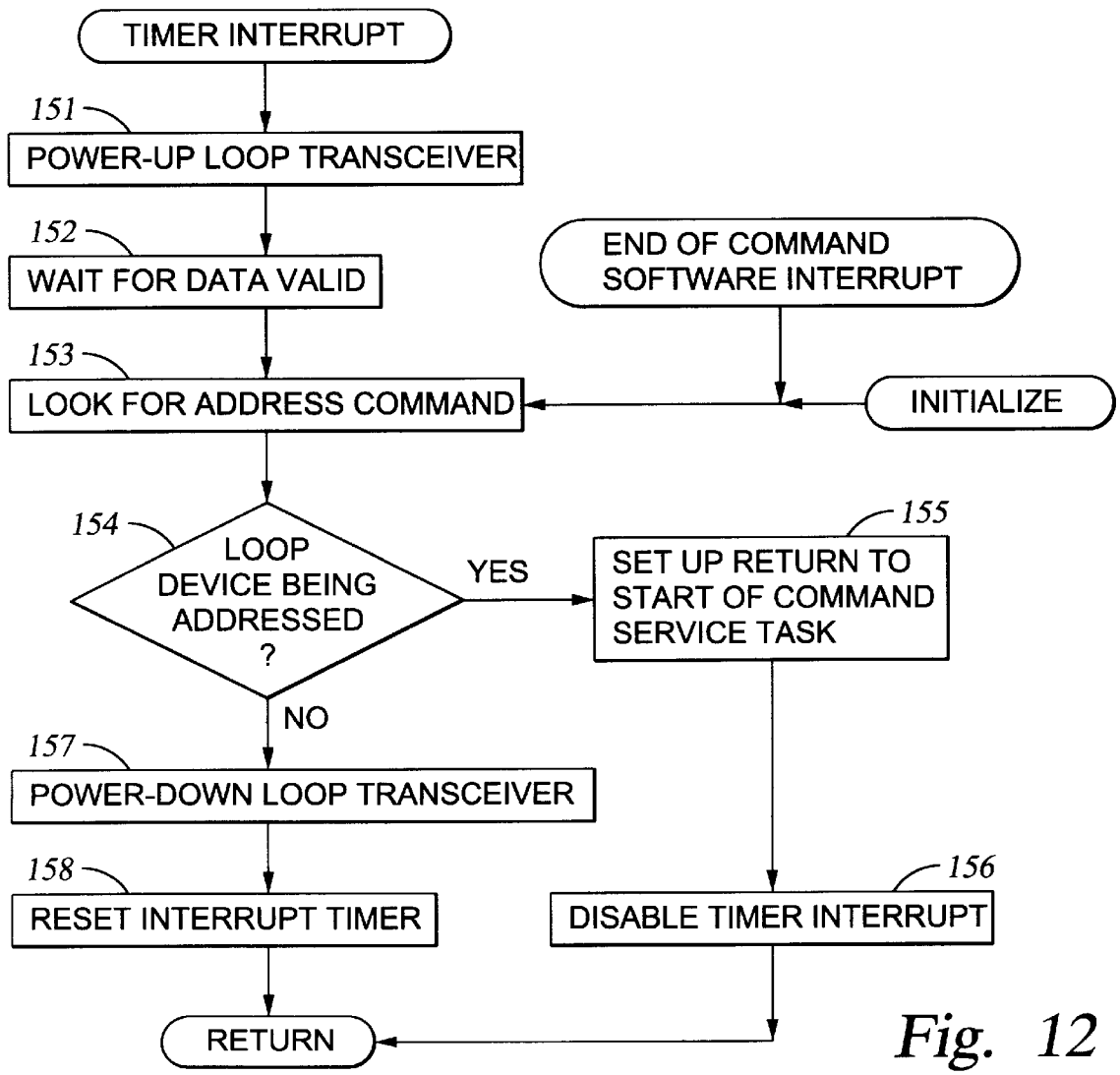
FIG. 12 is a flow chart of a timer interrupt routine for permitting the controller of the loop device to periodically power down a transceiver and to power it up only during brief intervals when the loop controller transmits a word sync code and a loop device address according to the transmission format shown in FIG. 10.

Turning now to FIG. 12, there is shown a flow chart of a timer interrupt routine for the device controller to permit the device controller to power up and power down the transceiver of FIG. 9 at the periodic intervals required for scanning for the transceiver address. When the timer interrupt occurs at the end of the period Ts as shown in FIG. 10, the controller powers up the loop transceiver in a first step 151. Then in step 152 the controller waits for the data valid signal to be asserted by the transceiver circuitry in FIG. 11. Next in step 153 the controller looks for an address command in the data from the transceiver. Step 153 is also accessed by an "end of command software interrupt" entry point, and is also used as an initial entry point when the system is initially powered up. Next, in step 154, the controller checks the address of the address command to determine whether the loop device is being addressed. If so, then execution branches from step 154 to step 155 to set up a return to the start of a command service task. This command service task will decode the data following the address command as a command from the loop controller. Then in step 156, the controller disables the timer interrupt, and execution returns.

If in step 154 the controller found that it was not being addressed, then in step 157 the controller powers down the loop transceiver. Next, in step 158, the controller resets the timer interrupt so that the interrupt will occur after the duration of time Ts, and execution returns. The duration of time Ts could be constant. Alternatively, the duration of time Ts could be variable. If the duration of time Ts were variable, then the loop controller could insert after each address on the data stream of FIG. 10, a parameter indicating the duration of time Ts to the next word sync and address code. In this case, in the routine of FIG. 12, the controller would read the parameter in step 157 before powering down the loop transceiver, and in step 158 the controller would use the parameter to reset the interrupt timer with a variable time value causing the next timer interrupt of the controller to occur just before the next word sync and address code in the data stream.

Figure 13:
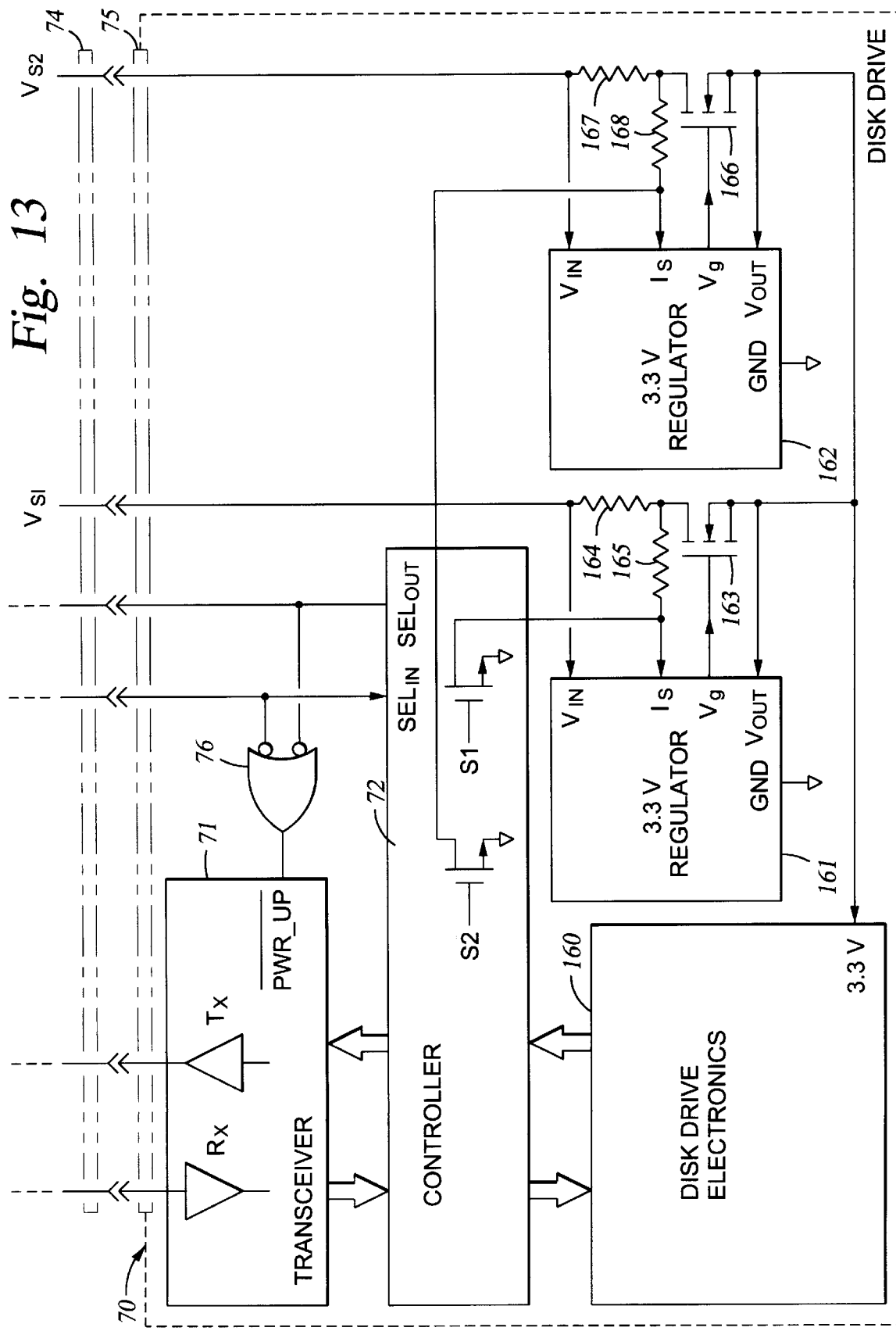
FIG. 13 is a schematic diagram showing how a disk drive can be given the capability of selecting among multiple power sources for providing a regulated voltage to disk drive circuits.

Turning now to FIG. 13, there is shown a schematic diagram illustrating how the disk drive 70 can be given the capability of selecting among multiple power sources (Vs1 and Vs2) to provide a regulated voltage (3.3 volts) to disk drive electronics 160. For example, Vs1 and Vs2 can be independent 5 volt sources, or Vs1 could be a 5 volt source and Vs2 could be a 12 volt source. The disk drive has two 3.3 volt regulators 161 and 162. The regulator 161 is powered by Vs1, and the regulator 162 is powered by Vs2. The regulators, for example, are part No. M1C5156 sold by MICREL Corp., 1849 Fortune Drive, San Jose, Calif. The regulator 161 is constructed to work with an N-channel enhancement-mode MOSFET 163 and a current sensing resistor 164. A resistor 165 is added to the circuit of the regulator 161 and an "open source" output of the controller 72 is connected to the current sense (Is) input of the regulator. Therefore, the controller can enable or disable the regulator 161 by asserting or de-asserting a select signal S1, active low. In a similar fashion, the regulator 162 has an associated N-channel pass transistor 166, current sensing resistor 167, and an additional resistor 168 for permitting the current sensing input (Is) of the regulator 162 to be connected to an open-source output of the controller.

Although only two power sources Vs1 and Vs2 are shown in FIG. 13, a Fiber Channel compatible disk drive should have input pins on its connector 75 for two independent 5 volt power sources and two independent 12 volt power sources. Therefore, so that the controller 72 could select any of these four power sources, the disk drive 70 could have two additional 3.3 volt regulator circuits, so that each power source would have a respective regulator circuit. During configuration of the disk drives in the storage subsystem, the storage controller would select which supply should power the disk drive electronics in each disk drive. Preferably the storage controller would attempt to balance the load on each of the 5 volt supplies, and if the capacity of the 5 volt supplies would be reached, then storage controller would select and balance between the 12 volt supplies. In this fashion, the storage controller would attempt to minimize power usage and enhance reliability.

Various modifications of the invention will become apparent to persons of ordinary skill in the art from the foregoing description. For example, the different embodiments of the invention described above could be combined in a single system. In particular, the timer interrupt method of FIG. 12 could be used together with the method of FIGS. 7 and 8 in a system employing redundant loops. In this case, the transceivers de-activated in FIGS. 7 and 8 would have all of their circuits shut off, and the transceivers activated in FIGS. 7 and 8 would have their bit synchronization and regeneration circuits (top half of FIG. 9) continuously powered up, and their other circuits (bottom half of FIG. 9) selectively powered up and powered down by the timer interrupt routine of FIG. 12.

What is claimed is:

1. A method for reducing power consumed by transceivers of multiple data processing devices interconnected by a data transmission loop, each of the data processing devices passing data from a previous data processing device in the data transmission loop to a next data processing device in the data transmission loop when not transmitting data onto the data transmission loop, said method comprising the steps of selectively activating circuits in a transceiver of one of the data processing devices in the data transmission loop when said one of the data processing devices in the data transmission loop is to communicate with another data processing device in the data transmission loop, and selectively deactivating said circuits in said transceiver of said one of the data processing devices when said one of the data processing devices is not to communicate with another data processing device in the data transmission loop.

2. The method as claimed in claim 1, wherein said circuits in said transceiver of said one of the data processing devices that are selectively activated and deactivated include circuits which are used for serializing data transmitted to said data transmission loop from a controller of said one of the data processing devices, and circuits which are used for deserializing data received from said data transmission loop by said controller of said one of the data processing devices.

3. The method as claimed in claim 1, which includes continuously powering a bit clock used by said transceiver of said one of the data processing devices, in order to avoid any substantial delay in establishing communication after activating said circuits in the transceiver of said one of the data processing devices.

4. The method as claimed in claim 1, which includes said one of the data processing devices detecting that communication is not to occur with said one of the data processing devices over said data transmission loop for a period of time, and then said one of the data processing devices selectively deactivating said circuits in said transceiver of said one of the data processing devices for said period of time.

5. The method as claimed in claim 4, wherein said one of the data processing devices detects that communication is not to occur with said one of the data processing devices over said data transmission loop for said period of time by inspecting an address transmitted over said data transmission loop.

6. The method as claimed in claim 5, wherein said data processing devices include a loop controller, and said method includes said loop controller periodically transmitting over said data transmission loop addresses of other ones of said data processing devices.

7. The method as claimed in claim 1, wherein said data processing devices include a loop controller, and said method includes said loop controller transmitting over an auxiliary data channel commands for selectively activating circuits in said transceiver of said one of the data processing devices when said one of the data processing devices is to communicate with another data processing device in the data transmission loop, and for selectively deactivating said circuits in said transceiver of said one of the data processing devices when said one of the data processing devices is not to communicate with another data processing device in the data transmission loop.

8. The method as claimed in claim 1, wherein said one of the data processing devices has more than one transceiver for communicating with another data processing device interconnected in said data transmission loop, and said method includes powering-up only one of the transceivers of said one of the data processing devices, detecting a failure of said one of the transceivers of said one of the data processing devices, and then powering up another one of the transceivers of said one of the data processing devices.

9. A method for reducing power consumed by transceivers of multiple data processing devices interconnected by a data transmission loop, each of the data processing devices passing data from a previous data processing device in the data transmission loop to a next data processing device in the data transmission loop when not transmitting data onto the data transmission loop, said data transmission loop including a loop controller for arbitrating access of the data processing devices to said data transmission loop, said method comprising the steps of selectively energizing circuits in a transceiver of one of the data processing devices in the data transmission loop when said one of the data processing devices is to communicate with said loop controller, and selectively de-energizing said circuits in said transceiver of said one of the data processing devices when said one of the data processing devices is not to communicate with said loop controller, wherein said circuits in said transceiver of said one of the data processing devices that are selectively energized and de-energized include circuits which serialize data transmitted to said data transmission loop from a controller of said one of the data processing devices and deserialize data received from said data transmission loop by said controller of said one of the data processing devices.

10. The method as claimed in claim 9, which includes continuously powering a bit clock used by said transceiver of said one of the data processing devices, in order to avoid any substantial delay in establishing communication after energizing said circuits in said transceiver of said one of the data processing devices.

11. The method as claimed in claim 9, which includes said one of the data processing devices detecting that communication is not to occur with said one of the data processing devices over said data transmission loop for a period of time by inspecting an address transmitted over said data transmission loop by said loop controller, and then said one of the data processing devices selectively de-energizing said circuits in said transceiver of said one of the data processing devices for said period of time.

12. The method as claimed in claim 9, which further includes said loop controller transmitting over an auxiliary data channel commands for selectively energizing circuits in said transceiver of said one of the data processing devices when said one of the data processing devices is to communicate with another data processing device in the data transmission loop, and for selectively de-energizing said circuits in said transceiver of said one of the data processing devices when said one of said devices in the data transmission loop is not to communicate with another data processing device in the data transmission loop.

13. The method as claimed in claim 9, wherein said one of the data processing devices has more than one transceiver for communicating with said loop controller over another data transmission loop, and said method includes powering-up only one of the transceivers of said one of the data processing devices, detecting a failure of said one of the transceivers of said one of the data processing devices, and then powering up another one of the transceivers of said one of the data processing devices.

14. The method as claimed in claim 9, wherein said loop controller is a controller of a data storage system, said data processing devices include disk drives in said data storage system, and said method includes said loop controller transmitting read and write commands over said data transmission loop to addressed ones of said disk drives.

15. The method as claimed in claim 14, which includes said disk drives selecting among a plurality of power sources in response to commands from said loop controller.

16. The method as claimed in claim 15, which includes said disk drives selecting among a 5 volt power source and a 12 volt power source in response to commands from said loop controller and regulating the selected power source to provide a regulated 3.3 volt supply to power components of the disk drives.

17. A method of operating a data storage system comprising a storage controller and a plurality of disk drives, each of the disk drives having at least two data transceivers being linked to the storage controller via first and second data transmission channels, each data transceiver of each disk drive being operable in a powered-up mode for communication between said each disk drive and the storage controller and in a low-power mode in response to signals from said storage controller, said method comprising the steps of:

said storage controller communicating with one powered-up transceiver in each disk drive;

said storage controller detecting a failure of said one powered-up transceiver to communicate with said storage controller; and upon detecting a failure of said one powered-up transceiver to communicate with said storage controller, said storage controller commanding another transceiver in said each disk drive to power-up for communication with said storage controller.

18. The method as claimed in claim 17, which includes said storage controller commanding the transceivers to operate in either said powered-up mode or said low-power mode by transmitting commands from said storage controller over an auxiliary data channel to addressed ones of said transceivers.

19. The method as claimed in claim 17, which further includes each disk drive detecting that communication between said storage controller and a powered-up transceiver in said each disk drive is not to occur for a period of time, and upon detecting that data communication between said powered-up transceiver and said storage controller is not to occur for said period of time, temporarily switching said powered-up transceiver to said low-power mode.

20. The method as claimed in claim 17, wherein each of said disk drives has an electronic switch circuit controlled by said data storage controller for receiving power from at least two power supplies, and said method includes said storage controller controlling said electronic switch circuit to allocating power from said power supplies among the disk drives in the data storage system.

21. A method of operation in a data storage system having a storage controller and a plurality of disk drives, each disk drive having a data transceiver linked to the storage controller for data transmission between the storage controller and said each disk drive, said data transceiver being operable in either a powered-up mode and a low-power mode, said method comprising the steps of:

said each disk drive detecting that communication between said storage controller and said data transceiver is not to occur for a period of time; and upon detecting that data communication between said powered-up transceiver and said storage controller is not to occur for said period of time, said each disk drive operating said data transceiver in said low-power mode for said period of time, and upon expiration of said period of time, said each disk drive operating said data transceiver in said powered-up mode.

22. A method of operation in a data storage system having a storage controller and a plurality of disk drives, each disk drive having an electronic switch circuit controlled by said data storage controller for receiving power from at least two power supplies, said storage controller being linked to said disk drives for transmitting data and commands between said storage controller and said disk drives, said method comprising the steps of:

said data storage controller transmitting to said each disk drive a command to operate the electronic switch circuit in said each disk drive for allocating power from said power supplies among the disk drives in the data storage system; and said each disk drive operating the electronic switch circuit in response to receipt of the command from said data storage controller to operate the electronic switch circuit in said each disk drive.

23. A system comprising multiple data processing devices interconnected in a data transmission loop, each of the data processing devices being interconnected in the data transmission loop for passing data from a previous data processing device in the data transmission loop to a next data processing device in the data transmission loop when not transmitting data onto the data transmission loop;

wherein each of said multiple data processing devices includes a transceiver having a receiver for receiving data from the previous data processing device in the data transmission loop, a bit synchronizer connected to said receiver for recovering a bit clock from the data received by the receiver, a transmitter connected to said bit synchronizer and said receiver for using said bit clock for transmitting the data received by the receiver to said next data processing device in said data transmission loop, and shift register circuitry connected to said receiver and said bit synchronizer and said transmitter for using said bit clock for de-serializing data received by said receiver to provide de-serialized data to said each of said multiple data processing devices and for serializing data from said each of said multiple data processing devices for transmission by said transmitter to the next data processing device in said data transmission loop when said each of said multiple data processing devices is transmitting data from said each of said multiple data processing devices to said next data processing device in said data transmission loop, wherein said shift register circuitry is energized when said each of said multiple data processing devices is transmitting data from said each of said multiple data processing devices to said next data processing device in said data transmission loop and de-energized when said each of said multiple data processing devices is not transmitting data from said each of said multiple data processing devices to said next data processing device in said data transmission loop.

24. The system as claimed in claim 23, wherein each of said multiple data processing devices has a timer for timing a duration of time when said shift register circuitry is not energized and thereafter energizing said shift register circuitry to permit said each of said multiple data processing devices to inspect data received by said receiver for a presence of a command enabling said each of said multiple data processing devices to communicate data over said data transmission loop by energizing said shift register circuitry for a further duration of time.

25. The system as claimed in claim 23, which includes a loop controller for arbitrating access of the data processing devices to said data transmission loop by enabling and disabling data transmission of the data processing devices onto the data transmission loop.

26. The system as claimed in claim 23, wherein said system includes an auxiliary data channel connecting each of said multiple data processing devices to said loop controller for permitting said loop controller to enable any one of said multiple data processing devices to communicate data over said data transmission loop by energizing said shift register circuitry.

27. The system as claimed in claim 23, wherein each of said multiple data processing devices includes more than one transceiver for communication with other ones of said multiple data processing devices in said data transmission loop, and a controller connected to the transceivers of said each of said multiple data processing devices for powering up one of the transceivers of said each of said multiple data processing devices and, upon detecting a failure in said one of the transceivers, powering down said one of the transceivers and powering up another one of the transceivers of said each of said multiple data processing devices.

28. The system as claimed in claim 23, wherein said data processing devices include disk drives for data storage.

29. The system as claimed in claim 28, wherein said system has a plurality of power sources and said disk drives have circuitry connected to said plurality of power sources for selecting among the plurality of power sources in response to commands received over said data transmission loop.

30. A data storage system comprising:

a storage controller; and a plurality of disk drives, each of the disk drives having at least two data transceivers being linked to the storage controller via respective first and second data transmission loops, each of the first and second data transmission loops linking the transceivers of a plurality of the disk drives in a serial fashion so that data transmitted from at least one of the disk drives in each data transmission loop passes through a transceiver of a next data processing device in each of the first and second data transmission loops;

each data transceiver of each disk drive being operable in a powered-up mode for communication between said each disk drive and the storage controller and in a low-power mode in which said each transceiver passes data through the data transmission loop.

31. The data storage system as claimed in claim 30, wherein the transceivers are responsive to commands from the storage controller to operate in either said powered-up mode or said low-power mode, and said storage controller is programmed to communicate with one powered-up transceiver in each disk drive, to detect a failure of said one powered-up transceiver to communicate with said storage controller, and upon detecting a failure of said one powered-up transceiver to communicate with said storage controller, to command another transceiver in said each disk drive to power-up for communication with said storage controller.

32. The data storage system as claimed in claim 30, further including an auxiliary data channel linking said storage controller to said transceivers for transmitting commands from said storage controller to said transceivers for commanding addressed ones of said transceivers to operate in either said powered-up mode or said low-power mode.

33. The data storage system as claimed in claim 30, wherein each transceiver in each disk drive is coupled to a disk drive controller in said each disk drive, and said disk drive controller is programmed to detect that data communication between said each transceiver and said storage controller is not to occur for a period of time, and upon detecting that data communication between said each transceiver and said storage controller is not to occur for said period of time, switching said each transceiver to said low-power mode for said period of time, and after said period of time, switching said each transceiver to said powered-up mode.

34. The data storage system as claimed in claim 30, wherein each of said disk drives has an electronic switch circuit controlled by said data storage controller for receiving power from at least two power supplies, and said data storage controller is programmed to operate said electronic switch circuit for allocating power from said power supplies among the disk drives in the data storage system.

35. The data storage system as claimed in claim 34, wherein said at least two power supplies include a five volt power supply and a twelve volt power supply.

36. A data storage system comprising:

a storage controller; and a plurality of disk drives; each disk drive having a disk drive controller, and a data transceiver linked to the storage controller for data transmission between the storage controller and said each disk drive, said data transceiver being operable in either a powered-up mode and a low-power mode, said disk drive controller being programmed to detect that communication between said storage controller and said data transceiver is not to occur for a period of time, and upon detecting that data communication between said powered-up transceiver and said storage controller is not to occur for said period of time, to temporarily operate said data transceiver in said low-power mode for said period of time.

37. A data storage system comprising:

at least two power supplies;

a storage controller; and a plurality of disk drives, each disk drive having an electronic switch circuit for receiving power from said at least two power supplies, said storage controller being linked to said disk drives for transmitting data and commands between said storage controller and said disk drives, including a command transmitted from said storage controller to said each disk drive for said storage controller to operate said electronic switch circuit for allocating power from said power supplies among the disk drives in the data storage system.

* * * * *